(12) United States Patent
Soman et al.

(10) Patent No.: US 10,215,281 B2
(45) Date of Patent: Feb. 26, 2019

(54) SEAL ASSEMBLY FOR SEALING RELATIVELY MOVABLE COMPONENTS

(71) Applicant: The Boeing Company, Chicago, IL (US)

(72) Inventors: Charuhas M. Soman, Bothell, WA (US); Keith Townsend, Everett, WA (US); Eric D. Blohm, Bellevue, WA (US); Richard B. Tanner, Seattle, WA (US); Mark J. Herzberg, Seattle, WA (US); Ralph E. Hardin, Arlington, WA (US)

(73) Assignee: The Boeing Company, Chicago, IL (US)

( * ) Notice: Subject to any disclaimer, the term of this patent is extended or adjusted under 35 U.S.C. 154(b) by 251 days.

(21) Appl. No.: 15/146,449

(22) Filed: May 4, 2016

(65) Prior Publication Data
US 2017/0321804 A1   Nov. 9, 2017

(51) Int. Cl.
*B64C 3/56* (2006.01)
*F16J 15/02* (2006.01)
(Continued)

(52) U.S. Cl.
CPC ............... *F16J 15/027* (2013.01); *B64C 3/56* (2013.01); *F16J 15/061* (2013.01); *F16J 15/122* (2013.01)

(58) Field of Classification Search
CPC  F16J 15/02; F16J 15/021; F16J 15/022; F16J 15/024; F16J 15/025; F16J 15/027; F16J 15/16; B60J 10/15; B60J 10/16; B60J 10/18; B60J 10/20; B60J 10/24; B60J 10/26; B60J 10/30; B60J 10/33; B60J 10/80; B60J 10/82; B60J 10/84;
(Continued)

(56) References Cited

U.S. PATENT DOCUMENTS 2,654,922 A * 10/1953 Krupp ................... B64C 1/1476
                                                49/477.1
2,938,245 A *  5/1960 Sehn ....................... B60R 13/06
                                                296/149

(Continued)

FOREIGN PATENT DOCUMENTS

CN    201953268    8/2011
WO    2007124743   11/2007

OTHER PUBLICATIONS

Extended European Search Report for European Patent Application No. EP17156378.6 dated Nov. 15, 2017.

*Primary Examiner* — Richard G Davis
(74) *Attorney, Agent, or Firm* — Kunzler, PC

(57) ABSTRACT

Disclosed herein is a seal assembly for sealing a gap between a first component and a second component is disclosed. The second component is movable relative to the first component. The seal assembly includes a rub strip and a seal strip. The rub strip includes a seal strip engagement surface having a convex shape. Additionally, the rub strip includes a first component engagement surface that is opposite the seal strip engagement surface and has a concave shape. The seal strip includes a rub strip engagement surface having a convex shape. Furthermore, the seal strip includes a second component engagement surface that is opposite the rub strip engagement surface and has a concave shape. The seal strip engagement surface is harder than the rub strip engagement surface.

14 Claims, 10 Drawing Sheets

(51) Int. Cl.
*F16J 15/06* (2006.01)
*F16J 15/12* (2006.01)

(58) Field of Classification Search
CPC .. B60J 10/85; B60J 10/90; B64C 1/14; B64C 1/1407; B64C 1/1476; B64C 3/26
See application file for complete search history.

(56) References Cited

U.S. PATENT DOCUMENTS

| | | | |
|---|---|---|---|
| 3,706,628 A * | 12/1972 | Azzola | B60J 10/18 |
| | | | 428/122 |
| 4,916,864 A | 4/1990 | Thompson | |
| 2002/0033581 A1 * | 3/2002 | Nolles | B60J 10/24 |
| | | | 277/628 |
| 2011/0079965 A1 * | 4/2011 | Dromain | F16J 15/027 |
| | | | 277/630 |
| 2014/0345199 A1 * | 11/2014 | Yahata | B64C 1/14 |
| | | | 49/475.1 |
| 2015/0276060 A1 * | 10/2015 | McGrath | F16J 15/027 |
| | | | 277/642 |
| 2016/0114895 A1 | 4/2016 | Perrier et al. | |
| 2016/0186866 A1 * | 6/2016 | Foster | F16J 15/027 |
| | | | 277/640 |

* cited by examiner

SEAL ASSEMBLY FOR SEALING RELATIVELY MOVABLE COMPONENTS

FIELD

This disclosure relates generally to seals, and more particularly to forming seals between components that are movable relative to each other.

BACKGROUND

Many conventional seals for sealing gaps between relatively stationary components are not conducive for sealing gaps between relatively movable components. Moreover, some conventional seals for sealing gaps between relatively movable components are not conducive for some applications, particularly aerospace applications, where available space and accessibility may be limited and where aerodynamics can be an important consideration. For example, certain conventional seals fixed to one primary structure (e.g., load carrying member) contact and form a seal directly against an opposing primary structure.

SUMMARY

The subject matter of the present application has been developed in response to the present state of the art, and in particular, in response to the problem of, and the need to, seal gaps between relatively movable components, that have not yet been fully solved by currently available techniques. Accordingly, the subject matter of the present application has been developed to provide a seal assembly, and associated apparatuses, systems, and methods for, sealing gaps between relatively movable components that overcomes at least some of the above-discussed shortcomings of prior art techniques.

According to one embodiment, a seal assembly for sealing a gap between a first component and a second component is disclosed. The second component is movable relative to the first component. The seal assembly includes a rub strip and a seal strip. The rub strip includes a seal strip engagement surface having a convex shape. Additionally, the rub strip includes a first component engagement surface that is opposite the seal strip engagement surface and has a concave shape. The seal strip includes a rub strip engagement surface having a convex shape. Furthermore, the seal strip includes a second component engagement surface that is opposite the rub strip engagement surface and has a concave shape. The seal strip engagement surface is harder than the rub strip engagement surface.

According to one implementation of the seal assembly, the seal strip is hollow.

In some implementations of the seal assembly, the seal strip is more compressible than the rub strip.

In yet certain implementations of the seal assembly, the concave shape of the first component engagement surface of the rub strip, the convex shape of the seal strip engagement surface of the rub strip, the convex shape of the rub strip engagement surface of the seal strip, and the concave shape of the second component engagement surface of the seal strip are curved.

According to some implementations of the seal assembly, the seal strip further includes an internal stiffener interposed between the rub strip engagement surface and the second component engagement surface of the seal strip. The internal stiffener is stiffer than the second component engagement surface. The internal stiffener can be made of a material different than that of the second component engagement surface. Furthermore, the internal stiffener can be curved to complement a curvature of the second component engagement surface of the seal strip.

In some implementations of the seal assembly, a radius of curvature of the rub strip engagement surface of the seal strip is less than that of the second component engagement surface of the seal strip. In the same or other implementation of the seal assembly, a radius of curvature of the seal strip engagement surface of the rub strip is less than that of the first component engagement surface of the rub strip.

According to certain implementations of the seal assembly, the rub strip further includes a first retainment element extending from the first component engagement surface in a direction away from the seal strip engagement surface. The seal strip further includes a second retainment element extending from the second component engagement surface in a direction away from the rub strip engagement surface. The seam assembly can further include a first retainment plate and a second retainment plate. The first retainment plate includes a first channel for receiving and retaining the first retainment element of the rub strip. The second retainment plate includes a second channel for receiving and retaining the second retainment element of the seal strip. The second retainment plate can be harder than the second retainment element of the seal strip. The first retainment element of the rub strip can have a first bulbous-shaped cross-section. The second retainment element of the seal strip can have a second bulbous-shaped cross-section. The first channel of the first retainment plate can have a cross-sectional shape complementing the first bulbous-shaped cross-section of the first retainment element. The second channel of the second retainment plate can have a cross-sectional shape complementing the second bulbous-shaped cross-section of the second retainment element. The seal assembly may further include a rod passing through the second retainment element of the seal strip, where the rod is harder than the second retainment element.

According to another embodiment, a system includes a first component and a second component movable relative to the first component. A gap is defined between the first component and the second component. The system also includes a rub strip fixed to the first component and positioned within the gap. The rub strip includes a seal strip engagement surface, having a curved convex shape, and a first component engagement surface, engaged with the first component and opposite the seal strip engagement surface. The first component engagement surface has a planar shape when engaged with the first component and has a curved concave shape when not engaged with the first component. The system further includes a seal strip fixed to the second component and positioned within the gap. The seal strip includes a rub strip engagement surface having a curved convex shape, where the rub strip is harder than the rub strip engagement surface. Additionally, the seal strip includes a second component engagement surface engaged with the second component and opposite the rub strip engagement surface. The second component engagement surface has a planar shape when engaged with the second component and has a curved concave shape when not engaged with the second component. At least a portion of the rub strip engagement surface of the seal strip is deformed against at least a portion of the seal strip engagement surface of the rub strip, at a location within the gap and spaced apart from the first component and the second component, to form a seal between the first component and the second component as the second component moves relative to the first component.

In some implementations, the system further includes a first retainment plate that includes a first channel and a second retainment plate that includes a second channel. The first component includes a first part and a second part. The second component includes a third part and a fourth part. The rub strip further includes a first retainment element extending from the first component engagement surface in a direction away from the seal strip engagement surface, where the first retainment element is received and retained in the first channel of the first retainment plate. The seal strip further includes a second retainment element extending from the second component engagement surface in a direction away from the rub strip engagement surface, where the second retainment element is received and retained in the second channel of the second retainment plate. The first retainment plate is fixed between the first part and the second part of the first component such that no portion of the first retainment plate is positioned in the gap. The second retainment plate is fixed between the third part and the fourth part of the second component such that no portion of the second retainment plate is positioned in the gap. The first component can be one of a fixed base or a folding tip of a wing of an aircraft, and the second component can be another of the fixed base or the folding tip of the wing of the aircraft. The first part can be one of a first skin or a first rib of the first component, the second part can be another of the first skin or the first rib of the first component, the third part can be one of a second skin or a second rib of the second component, and the fourth part can be another of the second skin or the second rib of the second component. The first part of the first component, the second part of the first component, and the first retainment plate can be intercoupled together via at least one fastener passing through the first part of the first component, the second part of the first component, and the first retainment plate. The third part of the second component, the fourth part of the second component, and the second retainment plate can be intercoupled together via at least one fastener passing through the third part of the second component, the fourth part of the second component, and the second retainment plate.

According to certain implementations of the system, the second component rotates relative to the first component about an axis perpendicular to the first component engagement surface of the rub strip when engaged with the first component and the second component engagement surface of the seal strip when engaged with the second component. The second component can move translationally relative to the first component as the second component rotates relative to the first component. The portion of the rub strip engagement surface of the seal strip deformed against the seal strip engagement surface of the rub strip changes, and the portion of the seal strip engagement surface of the rub strip against which the portion of the rub strip engagement surface of the seal strip is deformed can change, as the second component rotates relative to the first component and as the second component moves translationally relative to the first component.

In yet another embodiment, a method of sealing a gap between a first component and a second component is disclosed. The method includes fixing a rub strip to the first component and fixing a seal strip to the second component. The rub strip includes a seal strip engagement surface, having a curved convex shape, and a first component engagement surface, engaged with the first component and opposing the seal strip engagement surface. The first component engagement surface has a planar shape when engaged with the first component and has a curved concave shape when not engaged with the first component. The seal strip includes a rub strip engagement surface that has a curved convex shape. The rub strip is harder than the rub strip engagement surface. The seal strip further includes a second component engagement surface engaged with the second component. The second component engagement surface has a planar shape when engaged with the second component and has a curved concave shape when not engaged with the second component. Additionally, the method includes deforming the seal strip against the rub strip and moving the first component relative to the second component in a scissoring motion.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
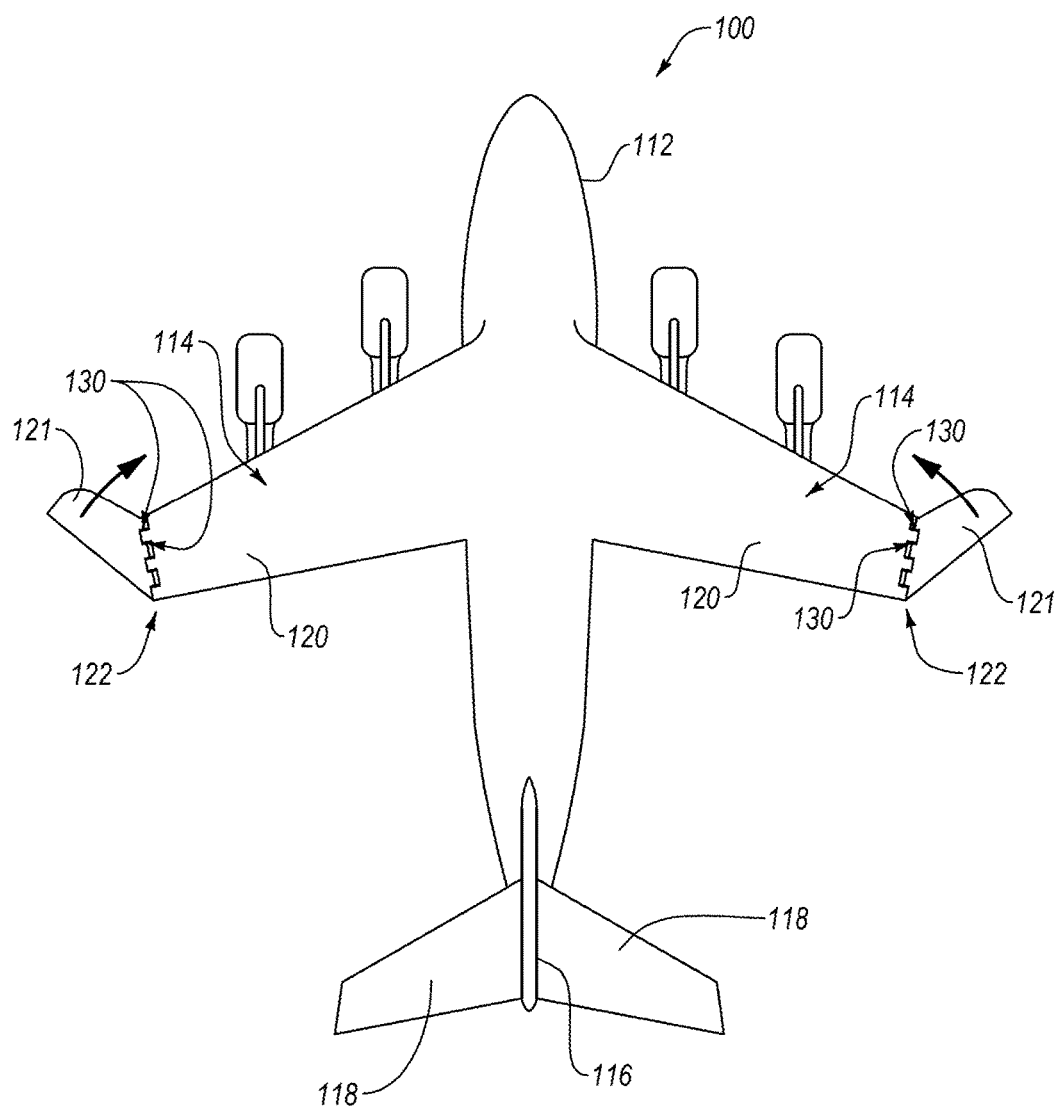
FIG. 1 is a top plan view of an aircraft, including wings with folding tips, according to one or more embodiments of the present disclosure.

Referring to FIG. 1, one embodiment of an aircraft 100 is shown. The depicted aircraft 100 includes a body 112 or fuselage, a pair of wings 114 coupled to and extending from the body 112, a vertical stabilizer 116 coupled to the body, and a pair of horizontal stabilizers 118 coupled to the body and/or the vertical stabilizer. Each of the wings 114 includes a first component 120, which can be a fixed base, and a second component 121, which can be a folding tip. The first component 120 is fixed directly to the body 112. For each wing 114, the second component 121 is coupled to a distal or free end of the first component 120 by a hinge 122. The hinge 122 facilitates relative movement between the first component 120 and the second component 121. More specifically, in one implementation, the second component 121 folds relative to the first component 120 via the hinge 122. The hinge 122 may include, or be coupled to, one or more actuators (e.g., motors) selectively operable to fold the second component 121 relative to the first component 120 and unfold the second component 121 relative to the first component 120.

Additionally, the hinge 122 includes one or more seal assemblies 130 between respective one or more portions of the first component 120 and the second component 121. As will be described in more detail below, each seal assembly 130 is configured to seal a gap between the respective one or more opposing portions of the first component 120 and the second component 121. The opposing portions of the first component 120 and the second component 121 can be opposing sides of a single tongue-and-groove coupling of a plurality of tongue-and-groove couplings along the hinge 122. Moreover, each seal assembly 130 maintains the seal as the second component 121 moves relative to the first component 120.

The aircraft 100 includes features representative of a commercial passenger or military transport aircraft. However, the aircraft 100 can be any of various other types of commercial or non-commercial aircraft, such as personal aircraft, fighter jets, helicopters, spacecraft, and the like. Moreover, although an aircraft is depicted in the illustrated embodiment, in other embodiments, another structure, such as a vehicle (e.g., boat, automobile, etc.) or non-mobile complex structure (e.g., building, bridge, machinery, etc.) can be used without departing from the essence of the present disclosure. Additionally, although the seal assemblies 130 are shown and described as sealing a gap between a folding tip of a wing of an aircraft and a fixed base of the wing, it is recognized that the seal assemblies 130 can seal a gap between any of various relatively movable components of an aircraft or any of various mobile or non-mobile structures.

Figure 2:
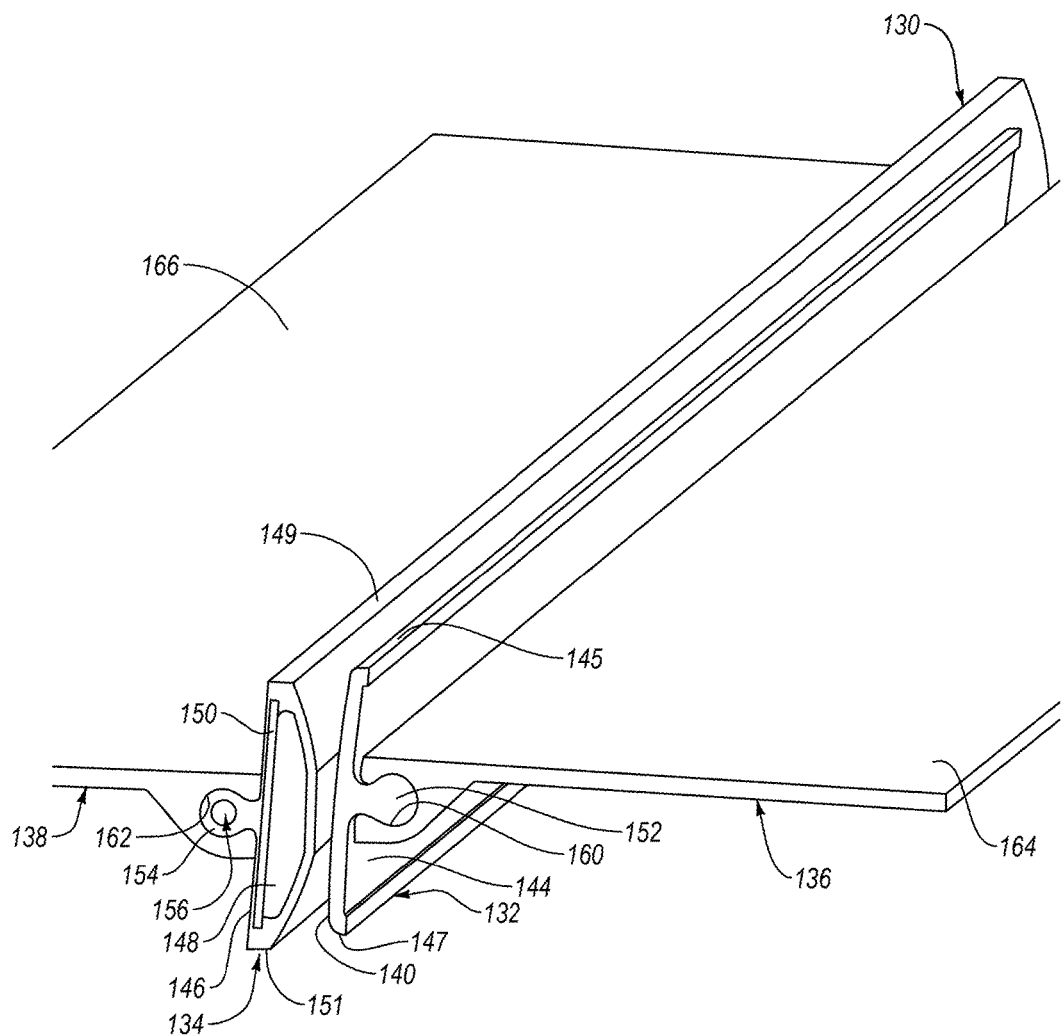
FIG. 2 is a perspective view of a seal assembly, shown with a seal strip in a beginning stage of movement relative to a rub strip, according to one or more embodiments of the present disclosure.

Referring to FIG. 2, according to one embodiment, the seal assembly 130 includes a rub strip 132 and a seal strip 134. Generally, when fixed to respective relatively movable components (see, e.g., FIG. 3), the seal strip 134 is positioned relative to the rub strip 132 such that the seal strip 134 deforms (e.g., compresses) against the rub strip 132 to form a seal between the relatively movable components.

Figure 4:
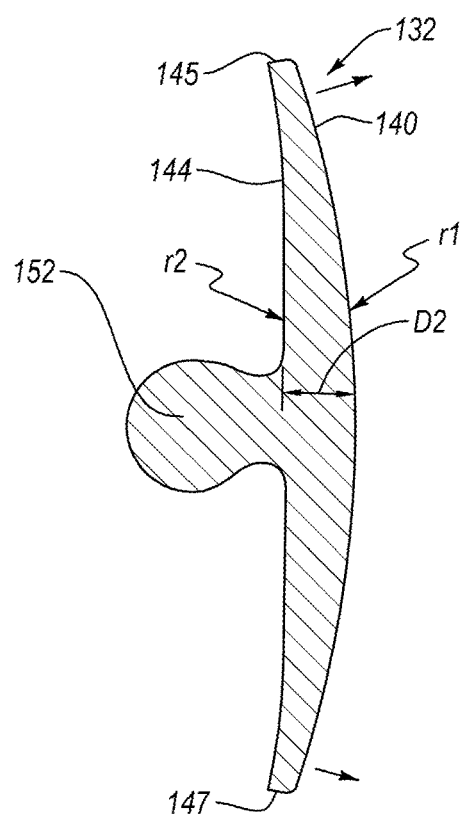
FIG. 4 is a side elevation view of a rub strip of a seal assembly, according to one or more embodiments of the present disclosure.

The rub strip 132 includes a seal strip engagement surface 140 that has a generally convex shape. In the illustrated implementation, as shown in FIG. 4, the convex shape of the seal strip engagement surface 140 is curved. The curved convex shape of the seal strip engagement surface 140 can have a radius of curvature r1 that is constant. Alternatively, the curved convex shape of the seal strip engagement surface 140 can have a radius of curvature r1 that varies, such that the curved convex shape of the seal strip engagement surface 140 can be considered parabolic in some implementations.

According to certain implementations, the convex shape of the seal strip engagement surface 140 is not curved or is only partially curved. For example, the seal strip engagement surface 140 may include converging planar surfaces that converge to a rounded (e.g., blunt) or relatively sharp tip.

The rub strip 132 further includes a first component engagement surface 144 opposite the seal strip engagement surface 140 of the rub strip 132. In some implementations, the first component engagement surface 144 is opposite the seal strip engagement surface 140 because the first component engagement surface 144 is effectively on an opposite side of the rub strip 132 than the seal strip engagement surface 140. The first component engagement surface 144 has a generally concave shape, at least when the first component engagement surface 144 is not engaged with a first component (see, e.g., FIG. 4). In the illustrated implementation, as shown in FIG. 4, the concave shape of the first component engagement surface 144 is curved. The curved concave shape the first component engagement surface 144 can have a radius of curvature r2 that is constant. Alternatively, the curved concave shape of the first component engagement surface 144 can have a radius of curvature r2 that varies, such that the curved concave shape of the first component engagement surface 144 can be considered parabolic in some implementations. In some implementations, the radius of curvature r2 of at least a portion of the curved concave shape of the first component engagement surface 144 is greater than at least a portion of the curved convex shape of the seal strip engagement surface 140. In yet certain implementations, the radius of curvature r2 of the entire curved concave shape of the first component engagement surface 144 is greater than the entire curved convex shape of the seal strip engagement surface 140. A minimum distance D2 is defined between the first component engagement surface 144 of the rub strip 132 and a crown of the seal strip engagement surface 140 (see, e.g., FIG. 4).

Additionally, the rub strip 132 includes a first retainment element 152 extending from the first component engagement surface 144 of the rub strip 132. The first retainment element 152 extends from the first component engagement surface 144 in a direction away from the seal strip engagement surface 140 (e.g., away from the crown of the seal strip engagement surface 140). In the illustrated implementation, the first retainment element 152 extends from the first component engagement surface 144 at a location on the first component engagement surface 144 approximately midway between opposing sides 145, 147 of the rub strip 132. However, in other implementations, the first retainment element 152 extends from the first component engagement surface 144 at a location on the first component engagement surface 144 a first distance away from the side 145 and a second distance away from the side 147, where the first distance is different than the second distance. Depending on the orientation of the rub strip 132, the side 145 can be a top side of the rub strip 132 and the side 147 can be a bottom side of the rub strip 132.

The first retainment element 152 can have a bulbous-shaped cross-section taken along a plane perpendicular to a length of the rub strip 132. As defined herein, a bulbous shape is a shape with a large head section and a relatively narrow neck section. Accordingly, the bulbous-shaped cross-section of the first retainment element 152 has a cross-sectional shape with a large head section and a relatively narrow neck section between the large head section and the first component engagement surface 144. In the illustrated implementation, the large head section of the first retainment element 152 has a substantially circular shape. However, in other implementations, the large head section of the first retainment element 152 can have any of various non-circular shapes.

Figure 5:
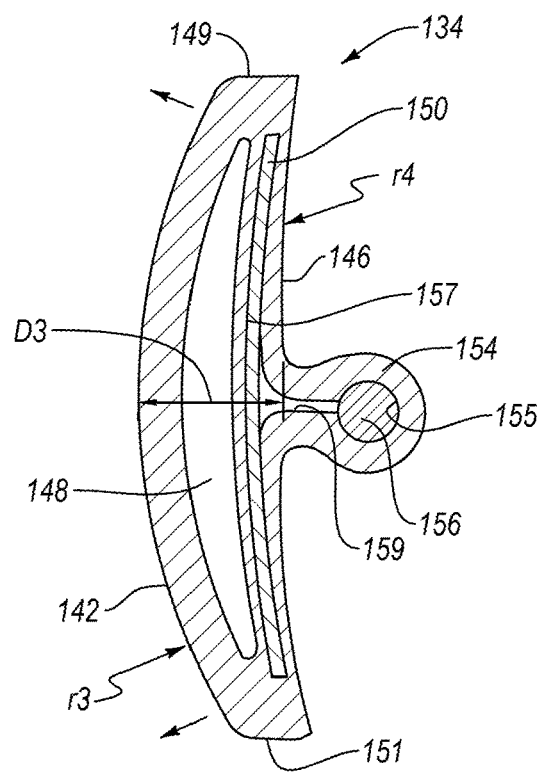
FIG. 5 is a side elevation view of a seal strip of a seal assembly, according to one or more embodiments of the present disclosure.

Referring to FIG. 5, the seal strip 134 includes a rub strip engagement surface 142 that has a generally convex shape. In the illustrated implementation, the convex shape of the rub strip engagement surface 142 is curved. The curved convex shape of the rub strip engagement surface 142 can have a radius of curvature r3 that is constant. Alternatively, the curved convex shape of the rub strip engagement surface 142 can have a radius of curvature r3 that varies, such that the curved convex shape of the rub strip engagement surface 142 can be considered parabolic in some implementations. According to certain implementations, the convex shape of the rub strip engagement surface 142 is not curved or is only partially curved. For example, the rub strip engagement surface 142 may include converging planar surfaces that converge to a rounded (e.g., blunt) or relatively sharp tip.

The seal strip 134 further includes a second component engagement surface 146 opposite the rub strip engagement surface 142 of the seal strip 134. In some implementations, the second component engagement surface 146 is opposite the rub strip engagement surface 142 because the second component engagement surface 146 is effectively on an opposite side of the seal strip 134 than the rub strip engagement surface 142. The second component engagement surface 146 has a generally concave shape, at least when the second component engagement surface 146 is not engaged with a second component (see, e.g., FIG. 5). In the illustrated implementation, as shown in FIG. 5, the concave shape of the second component engagement surface 146 is curved. The curved concave shape the second component engagement surface 146 can have a radius of curvature r4 that is constant. Alternatively, the curved concave shape of the second component engagement surface 146 can have a radius of curvature r4 that varies, such that the curved concave shape of the second component engagement surface 146 can be considered parabolic in some implementations. In some implementations, the radius of curvature r4 of at least a portion of the curved concave shape of the second component engagement surface 146 is greater than at least a portion of the curved convex shape of the rub strip engagement surface 142. In yet certain implementations, the radius of curvature r4 of the entire curved concave shape of the second component engagement surface 146 is greater than the entire curved convex shape of the rub strip engagement surface 142. A minimum distance D3 is defined between the second component engagement surface 146 of the seal strip 134 and a crown of the rub strip engagement surface 142 (see, e.g., FIG. 5).

Additionally, the seal strip 134 includes a second retainment element 154 extending from the second component engagement surface 146 of the seal strip 134. The second retainment element 154 extends from the second component engagement surface 146 in a direction away from the rub strip engagement surface 142 (e.g., away from the crown of the rub strip engagement surface 142). In the illustrated implementation, the second retainment element 154 extends from the second component engagement surface 146 at a location on the second component engagement surface 146 approximately midway between opposing sides 149, 151 of the seal strip 134. However, in other implementations, the second retainment element 154 extends from the second component engagement surface 146 at a location on the second component engagement surface 146 a first distance away from the side 149 and a second distance away from the side 151, where the first distance is different than the second distance. Depending on the orientation of the seal strip 134, the side 149 can be a top side of the seal strip 134 and the side 151 can be a bottom side of the seal strip 134.

The second retainment element 154 can have a bulbous-shaped cross-section taken along a plane perpendicular to a length of the seal strip 134. The bulbous-shaped cross-section of the second retainment element 154 has a cross-sectional shape with a large head section and a relatively narrow neck section between the large head section and the second component engagement surface 146. In the illustrated implementation, the large head section of the second retainment element 154 has a substantially circular shape. However, in other implementations, the large head section of the second retainment element 154 can have any of various non-circular shapes.

In some embodiments, the second retainment element 154 further includes a channel 155 extending longitudinally through the second retainment element 154. Generally, channel 155 is sized and shaped to receive and retain a retainment rod 156 of the seal strip 134. The retainment rod 156 is harder (e.g., stiffer) than the second retainment element 154 and thus helps to retain the shape (e.g., resist deformation) of the second retainment element 154 when the second retainment element 154 is subject to pull-out forces as will be explained in more detail below. The retainment rod 156 can be made from any of various materials, such as metals (e.g., aluminum) and hardened plastics. Although not shown, in some implementations, the first retainment element 152 also includes a channel with a retainment rod extending therethrough.

In the illustrated embodiment, the seal strip 134 further includes a hollow cavity 148 that extends along at least a portion of the length of the seal strip 134. The hollow cavity 148 is positioned between the rub strip engagement surface 142 and the second component engagement surface 146. The hollow cavity 148 can extend from proximate the side 149 of the seal strip 134 to proximate the side 151 of the seal strip 134. The hollow cavity 148 facilitates the deformability or compressibility of the rub strip engagement surface 142.

The seal strip 134 additionally includes a slot 157 extending along a least a portion of the length of the seal strip 134. The slot 157 is positioned between the hollow cavity 148 and the second component engagement surface 146. Moreover, the slot 157 can be curved to complement (e.g., match) the curvature of the second component engagement surface 146. The slot 157 is sized and shaped to matingly receive and retain an internal stiffener 150.

The internal stiffener 150 can be a plate-like element have a hardness (e.g., stiffness) greater than the second component engagement surface 146 of the seal strip 134. In some implementations, the rub strip engagement surface 142 of the seal strip 134 is made of the same material as the second component engagement surface 146 and has a similar hardness as the second component engagement surface 146. Accordingly, the internal stiffener 150 can also be harder (e.g., stiffer) than the rub strip engagement surface 142 of the seal strip 134. The internal stiffener 150 can be made from any of various relatively hard materials, such as metals, hardened plastics, ceramics, and fiber-reinforced polymers, such as fiberglass or carbon-fiber reinforced polymers. Moreover, the internal stiffener 150 is single-layered in one implementation and multi-layered in other implementations. In one particular example, the internal stiffener 150 is made from multiple layers of fiberglass.

Figure 3:
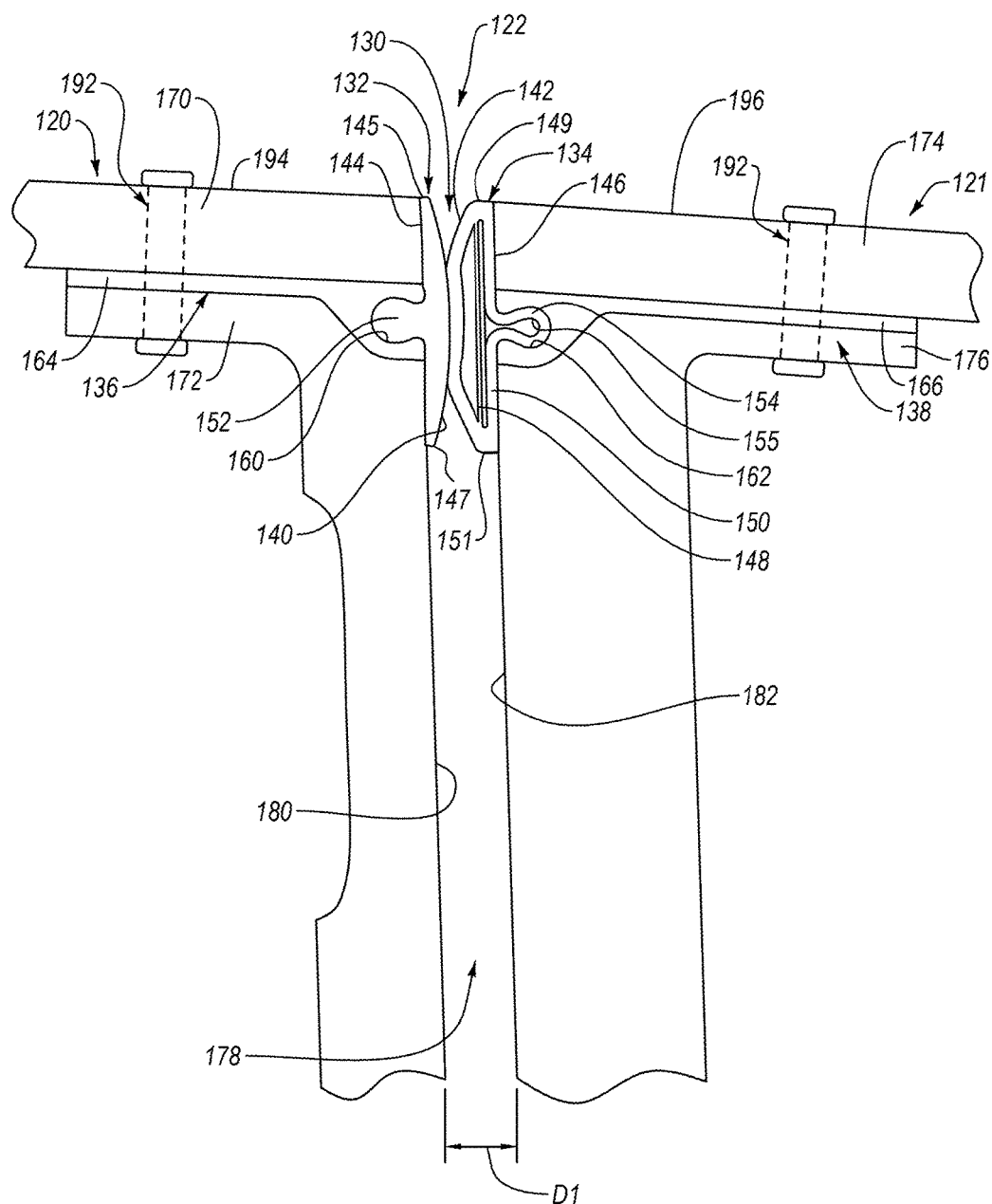
FIG. 3 is a side elevation view of a seal assembly sealing two relatively movable components, according to one or more embodiments of the present disclosure.

As shown in FIGS. 2, 3, and 5, the seal strip 134 may include a slot 159 extending between and intercoupling the slot 157 and the channel 155 of the second retainment element 154. The slot 159 allows for some expansion of the slot 157 and the channel 155 to facilitate the insertion of the internal stiffener 150 in the slot 157 and the insertion of the retainment rod 156 in the channel 155.

The rub strip 132 and the seal strip 134 are defined as strips because they are elongate in a lengthwise direction perpendicular to a minimum distance between the opposing sides 145, 147 of the rub strip 132 and the opposing sides 149, 151 of the seal strip 134, respectively. Accordingly, the rub strip 132 and seal strip 134 each extends lengthwise between respective opposing ends of the rub strip 132 and seal strip 134, respectively. The rub strip 132 and the seal strip 134 can have the same lengths or different lengths. In one embodiment, the rub strip 132 has a smaller length than the seal strip 134. Additionally, in some implementations, the rub strip 132 and the seal strip 134 each has a low or compact profile. For example, the minimum distances between the opposing sides 145, 147 of the rub strip 132 and the opposing sides 149, 151 of the seal strip 134, respectively, can be greater than the distances D2, D3 of the rub strip 132 and the seal strip 134, respectively. In certain implementations, the minimum distances between the opposing sides 145, 147 of the rub strip 132 and the opposing sides 149, 151 of the seal strip 134, respectively, can be at least two times the distances D2, D3 of the rub strip 132 and the seal strip 134, respectively.

Each of the rub strip 132 and seal strip 134 can be made using any of various manufacturing techniques. In one implementation, the features of the rub strip 132 are co-formed to form a one-piece monolithic construction, and the features of the seal strip 134 are co-formed to form a one-piece monolithic construction.

To facilitate fixing of the rub strip 132 and the seal strip 134 to a first component and a second component, respectively, the seal assembly 130 additionally includes a pair of retainment plates 136, 138. The retainment plates 136, 138 include respective channels 160, 162 extending a length of the retainment plates 136, 138. Each of the channels 160, 162 has a cross-sectional shape complementing the cross-sectional shape of the first and second retainment elements 152, 154, respectively. For example, the cross-sectional shape of the channel 160 may be a bulbous shape complementing the bulbous shape of the cross-section of the first retainment element 152 of the rub strip 132. Similarly, the cross-sectional shape of the channel 162 may be a bulbous shape complementing the bulbous shape of the cross-section of the second retainment element 154 of the seal strip 134.

As shown in FIGS. 2 and 3, the first and second retainment elements 152, 154 are positioned within the respective channels 160, 162 of the retainment plates 136, 138. Due to the complementary bulbous shapes of the retainment elements 152, 154 and the channels 160, 162 of the retainment plates 136, 138, when the retainment elements 152, 154 are positioned within respective channels 160, 162, pull-out of the retainment elements 152, 154 from the channels 160, 162, in a direction perpendicular to the minimum distance between the opposing sides 145, 147 of the rub strip 132 and the opposing sides 149, 151 of the seal strip 134, is resisted. Additionally, retention of the retainment elements 152, 154 by the respective channels 160, 162 is aided by the portion of the retainment plates 136, 138 defining the channels 160, 162 being made of a material harder or stronger than the material of the retainment elements 152, 154. In one implementation, for example, the retainment plates 136, 138 are made of metals (e.g., aluminum), composite materials, or hardened plastics. Positioning of the retainment elements 152, 154 within respective channels 160, 162 can be accomplished by sliding the retainment elements 152, 154 into and through the respective channels 160, 162.

The retainment plates 136, 138 also include respective shims 164, 166 coupled to the respective channels 160, 162. In the illustrated embodiment, the shims 164, 166 are thin-walled planar strips of material. In some implementations, the shims 164, 166 are co-formed with the respective channels 160, 162. More specifically, the shims 164, 166 may include thicker side portions that define the respective channels 160, 162.

Referring to FIG. 3, with the first and second retainment elements 152, 154 positioned within the respective channels 160, 162 of the retainment plates 136, 138, the rub strip 132 and seal strip 134 are fixed to respective first and second components 120, 121 (e.g., the fixed base and the folding tip of the wing 114) via the retainment plates 136, 138. The first component 120 includes a first part 170 and a second part 172. The first part 170 can be a skin of the first component 120 and the second part 172 can be a rib of the first component 120. Similarly, the second component 121 includes a third part 174 and a fourth part 176. The third part 174 can be a skin of the second component 121 and the fourth part 176 can be a rib of the second component 121. The rub strip 132 is fixed to the first component 120 by positioning and fixing the retainment plate 136 between the first part 170 and the second part 172 of the first component 120. Similarly, the seal strip 134 is fixed to the second component 121 by positioning and fixing the retainment plate 138 between the third part 174 and the fourth part 176 of the second component 121. Accordingly, in certain implementations, the retainment plates 136, 138 are effectively sandwiched between the first and second parts 170, 172 of the first component 120 and the third and fourth parts 174, 176 of the second component 121, respectively.

Although the rub strip 132 is shown coupled to first component 120 and the seal strip 134 is shown coupled to the second component 121, in some embodiments, the rub strip 132 is coupled to second component 121 and the seal strip 134 is coupled to the first component 120. Additionally, although in the illustrated embodiment of the aircraft 100, the first component 120 is considered a fixed component and the second component 121 is considered a movable component, in other embodiments, the first component 120 can be considered the movable component and the second component 121 can be considered the fixed component.

The retainment plates 136, 138 can be fixed in place between the first and second parts 170, 172 of the first component 120 and the third and fourth parts 174, 176 of the second component 121, respectively, using any of various fixation techniques. In the illustrated embodiment, at least one fastener 192 extends entirely through the first part 170, retainment plate 136, and second part 172 to fix the retainment plate 136 between the first and second parts 170, 172. Similarly, in the illustrated embodiment, at least one fastener 192 extends entirely through the third part 174, retainment plate 138, and fourth part 176 to fix the retainment plate 138 between the third and fourth parts 174, 176. Additionally, or alternatively, an adhesive or other bonding agent can be applied between the respective parts and the retainment plates 136, 138 to promote fixation of the retainment plates 136, 138 between the respective parts.

When fixed in place between the first and second parts 170, 172 of the first component 120 and the third and fourth parts 174, 176 of the second component 121, respectively, the retainment plates 136, 138 are positioned relative to facing surfaces 180, 182 of the first and second components 120, 121, respectively, such that the first component engagement surface 144 of the rub strip 132 engages (e.g., contacts) the surface 180 of the first component 120 and the second component engagement surface 146 of the seal strip 134 engages (e.g., contacts) the surface 182 of the second component 121. The facing surface 180 of the first component 120 includes both a facing surface of the first part 170 and a facing surface of the second part 172. Likewise, the facing surface 182 of the second component 121 includes both a facing surface of the third part 174 and a facing surface of the fourth part 176. Engagement between the first component engagement surface 144 of the rub strip 132 and the surface 180 of the first component 120 forms a seal between the rub strip 132 and the first component 120. Similarly, engagement between the second component engagement surface 146 of the seal strip 134 and the surface 182 of the second component 121 forms a seal between the seal strip 134 and the second component 121.

To promote engagement with the respective facing surfaces 180, 182 of the first and second components 120, 121, the first and second component engagement surfaces 144, 146 of the rub strip 132 and seal strip 134, respectively, are resiliently flexible. For example, each of the first and second component engagement surfaces 144, 146 are configured to resiliently flex from a non-flexed state (e.g., when disengaged from the facing surfaces 180, 182 of the first and second components 120, 121) as shown in FIGS. 4 and 5, respectively, to a flexed state (e.g., when engaged with the facing surfaces 180, 182 of the first and second components 120, 121). As mentioned above, in the non-flexed state, the first and second component engagement surfaces 144, 146 are concave. However, in the flexed state, the first and second component engagement surfaces 144, 146 are substantially planar so as to sit substantially flush against the respective facing surfaces 180, 182 of the first and second components 120, 121. In this manner, the concave shape of the first and second component engagement surfaces 144, 146 in the non-flexed shape, coupled with the resilient flexibility of the first and second component engagement surfaces 144, 146, effectively pre-loads the first and second component engagement surfaces 144, 146 for sustained engagement with the facing surfaces 180, 182. In other words, as the first and second component engagement surfaces 144, 146 engage the facing surfaces 180, 182 and are deformed against the facing surfaces 180, 182, the natural bias or tendency of the first and second component engagement surfaces 144, 146 to return to the unflexed state, and the resistance to such a return to the unflexed state provided by the engagement between the first and second retainment elements 152, 154 and the channels 160, 162 of the retainment plates 136, 138, retains the first and second component engagement surfaces 144, 146 flush against the facing surfaces 180, 182.

Accordingly, the concave shape (e.g., curvature) of the first and second component engagement surfaces 144, 146 of the rub strip 132 and seal strip 134 promotes sustained substantially flush engagement of the first and second component engagement surfaces 144, 146 against the facing surfaces 180, 182 of the first and second components 120, 121. In turn, the flush engagement of the first and second component engagement surfaces 144, 146 against the facing surfaces 180, 182 promotes the sealing effect between the first and second component engagement surfaces 144, 146 and the facing surfaces 180, 182.

When fixed in place between the first and second parts 170, 172 of the first component 120 and the third and fourth parts 174, 176 of the second component 121, respectively, the retainment plates 136, 138 are positioned relative to each other such that the seal strip engagement surface 140 of the rub strip 132 and the rub strip engagement surface 142 of the seal strip 134 engage (e.g., contact) each other. The convex shapes (e.g., curvature) of the seal strip engagement surface 140 and rub strip engagement surface 142 help to ensure at least a portion of the rub strip engagement surface 142 remains engaged with the seal strip engagement surface 140 when the second component 121 moves relative to the first component 120. The rub strip engagement surface 142 is configured to deform or compressed when engaged with the seal strip engagement surface 140.

To facilitate a consistent deformation or compression of the rub strip engagement surface 142, and thus a consistent seal between the rub strip engagement surface 142 and the seal strip engagement surface 140, the rub strip engagement surface 142 is harder than the seal strip engagement surface 140 such that only the rub strip engagement surface 142 is deformed or compressed when the rub strip engagement surface 142 and the seal strip engagement surface 140 are engaged. In one specific implementation, for example, the rub strip 132, including the seal strip engagement surface 140, is made of a semi-rigid material, such as a thermoplastic (e.g., nylon), and the seal strip 134, including the rub strip engagement surface 142, is made of one or more layers of a resiliently flexible material, such as Dacron®.

Additionally, the distance D2 of the rub strip 132 and the distance D3 of the seal strip 134 are selected such that, when the rub strip 132 and seal strip 134 are fixed to the first and second components 120, 121 via the retainment plates 136, 138, a desired deformation or compression of the rub strip engagement surface 142 is achieved. As shown in FIG. 3, the first component 120 is positioned relative to the second component 121 such that a gap 178, having a minimum distance D1, is defined between the opposing surfaces 180, 182 of the first and second components 120, 121. The distance D2 of the rub strip 132 plus the distance D3 of the seal strip 134 is greater than the distance D1 of the gap 178 by a quantity corresponding with the desired deformation or compression of the rub strip engagement surface 142. The desired deformation or compression of the rub strip engagement surface 142 can be expressed in terms of a percentage of the rub strip engagement surface 142 being deformed or compressed. In one implementation, for example, the percentage of the rub strip engagement surface 142 being deformed or compressed is between about 20% and about 25%.

As an additional consideration, each of the distance D2 of the rub strip 132 and the distance D3 of the seal strip 134 is less than the distance D1 of the gap 178 such that any portions of the rub strip 132 or seal strip 134 not engaged with each other do not contact the opposing first or second component 120, 121. For example, the rub strip 132, extending a distance D2 into the gap 178 and being harder than the seal strip 134, ensures an engagement area 190 (see, e.g., FIGS. 9-12) for the seal strip 134 that is positioned away from or spaced-apart from the first component 120. In this manner, the seal strip 134 does not contact the first component 120 as the second component 121 moves relative to the first component 120. Similarly, because the distance D2 of the rub strip 132 is less than the distance D1 of the gap 178, the rub strip 132 does not contact the second component 121 as the second component 121 moves relative to the first component 120. Moreover, in certain implementations, when fixed between the first part 170 and second part 172 of the first component 120, no portion of the retainment plate 136 is positioned in the gap 178. Likewise, in certain implementations, when fixed between the third part 174 and the fourth part 176 of the second component 121, no portion of the retainment plate 138 is positioned in the gap 178. Because no portion of the retainment plates 136, 138 is positioned in the gap 178, the seal assembly 130 can be used to seal smaller gaps compared to conventional seals.

In some embodiments, depending on the location of the retainment plates 136, 138 relative to exterior surfaces 194, 196 of the first and second components 120, 121, respectively, the minimum distance between the opposing sides 145, 147 of the rub strip 132 and the minimum distance between the opposing sides 149, 151 of the seal strip 134 are selected such that the sides 145, 149 proximate the exterior surfaces 194, 196 are substantially flush with the exterior surfaces 194, 196, respectfully. Positioning the side 145 of the rub strip 132 substantially flush with the exterior surface 194 of the first component 120 and positioning the side 149 of the seal strip 134 substantially flush with the exterior surface 196 of the second component 121 promotes aerodynamics.

Figure 6:
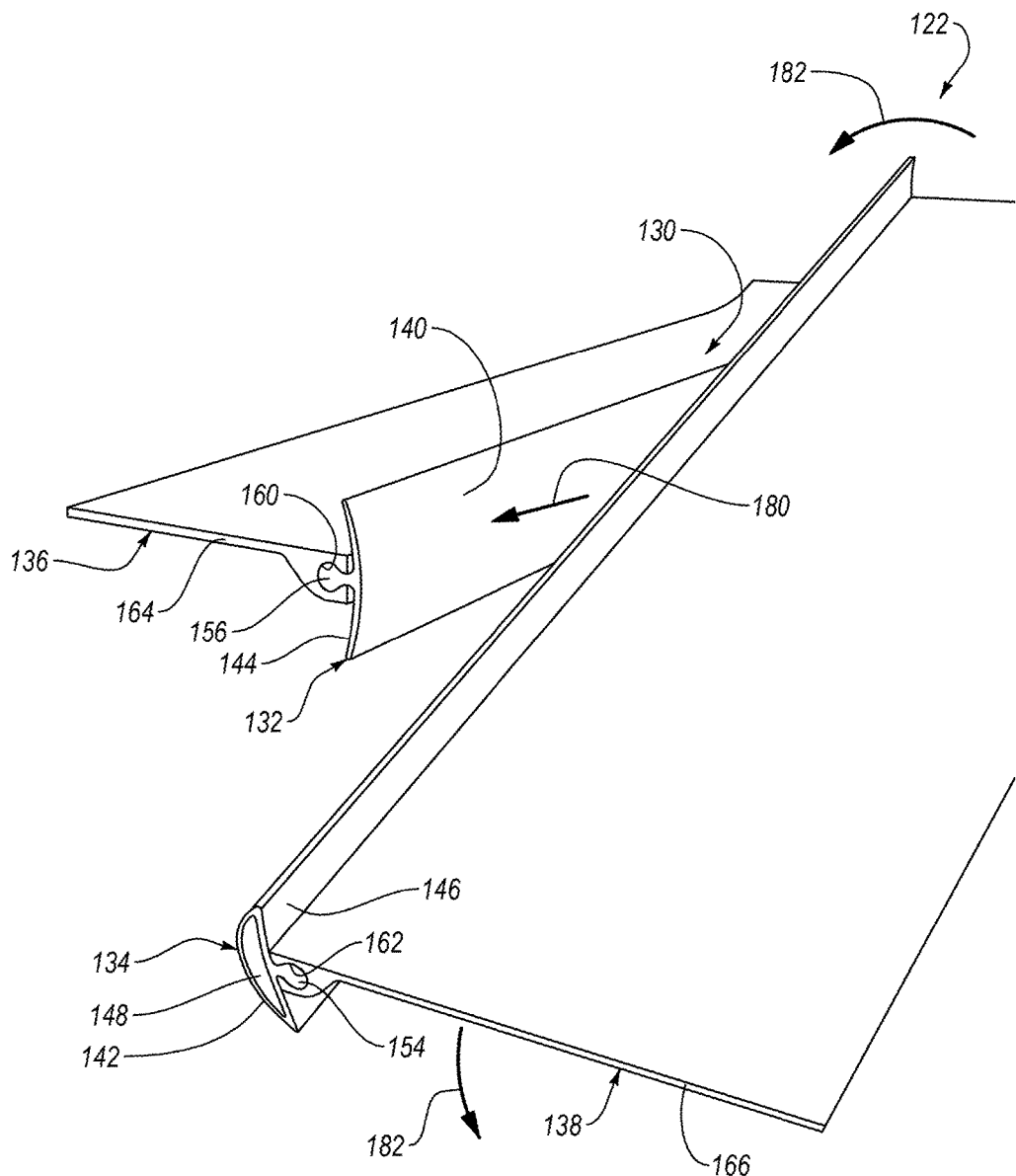
FIG. 6 is a perspective view of a seal assembly, shown with a seal strip in a first intermediate stage of movement relative to a rub strip, according to one or more embodiments of the present disclosure.
Figure 7:
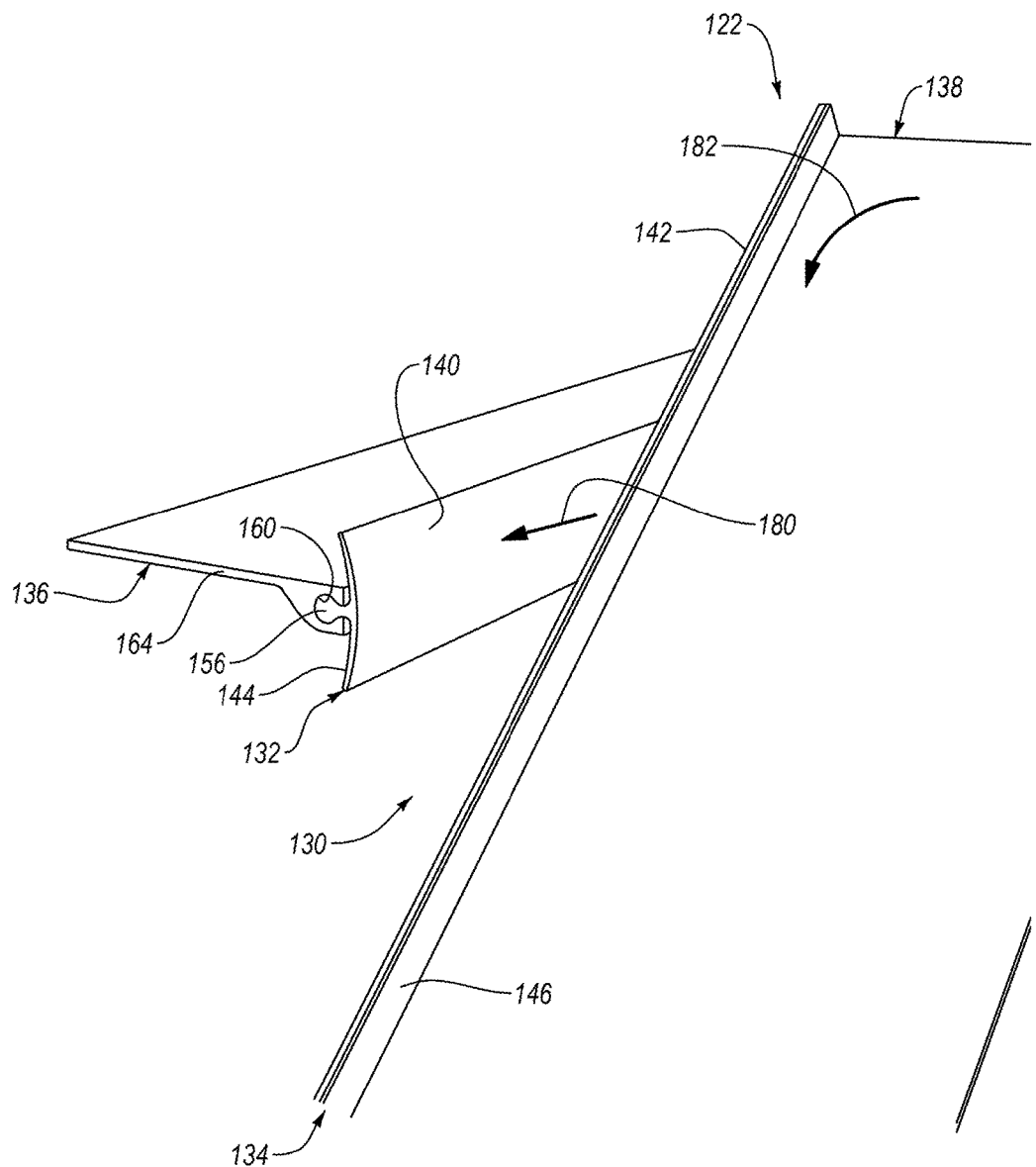
FIG. 7 is a perspective view of a seal assembly, shown with a seal strip in a second intermediate stage of movement relative to a rub strip, according to one or more embodiments of the present disclosure.
Figure 8:
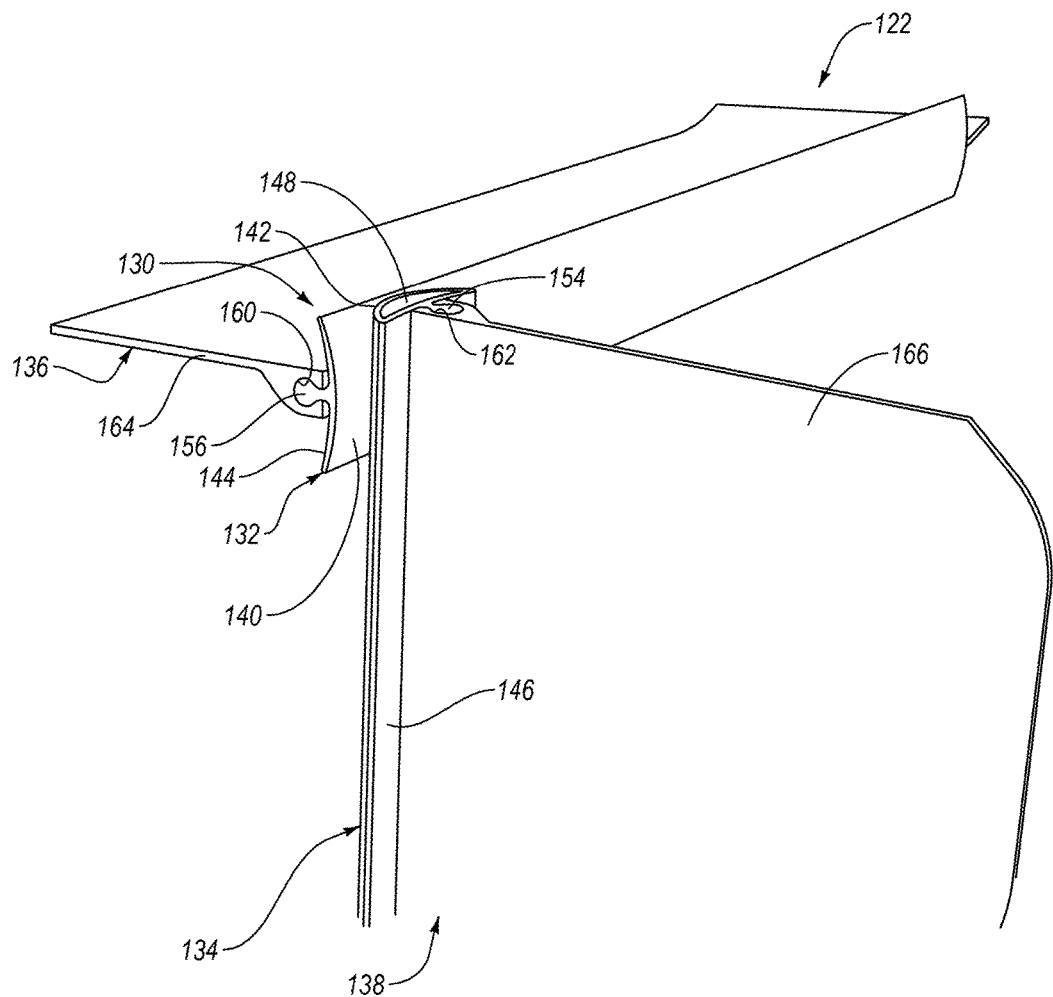
FIG. 8 is a perspective view of a seal assembly, shown with a seal strip in a final intermediate stage of movement relative to a rub strip, according to one or more embodiments of the present disclosure.
Figure 9:
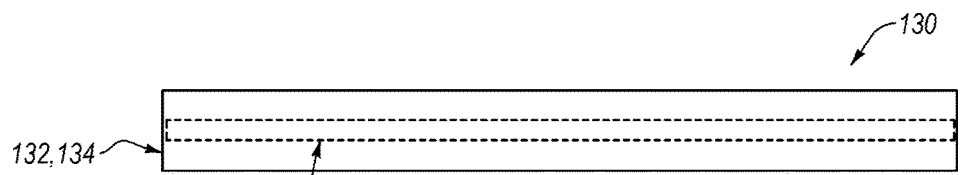
FIG. 9 is a schematic side elevation view of a seal assembly, shown with a seal strip in a beginning stage of movement relative to a rub strip, according to one or more embodiments of the present disclosure.
Figure 10:
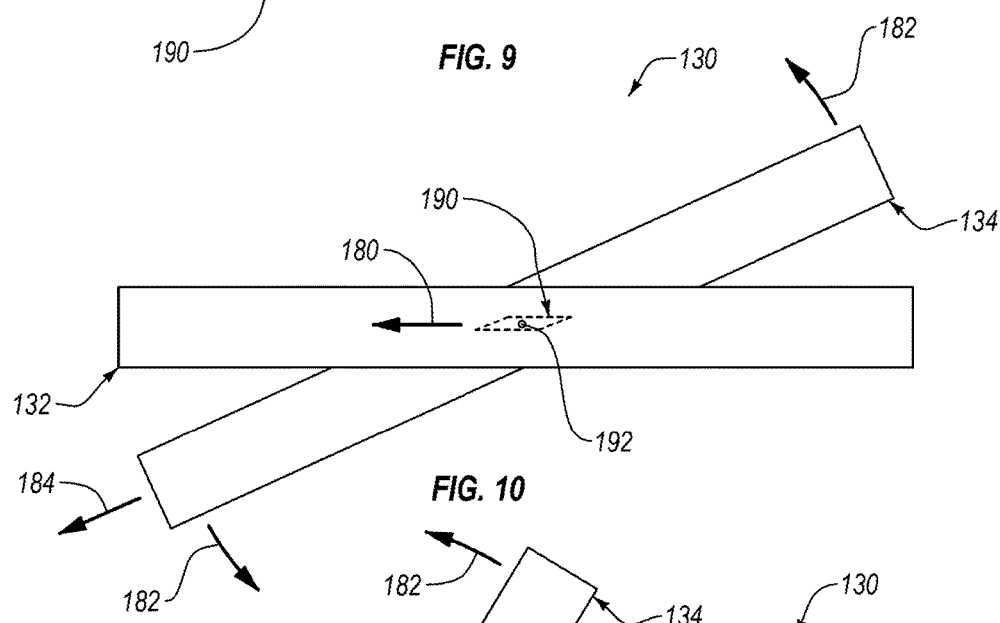
FIG. 10 is a schematic side elevation view of a seal assembly, shown with a seal strip in a first intermediate stage of movement relative to a rub strip, according to one or more embodiments of the present disclosure.

Referring to FIGS. 2 and 6-12, according to one embodiment, the relative motion between the rub strip 132 (and thus the first component 120 to which the rub strip 132 is fixed) and the seal strip 134 (and thus the second component 121 to which the seal strip 134 is fixed) is shown in various stages of movement. In the illustrated embodiment, the movement between the rub strip 132 and the seal strip 134 can be considered a sweeping or scissoring motion, similar to that of two legs of a pair of scissors. As shown in FIGS. 2 and 9, in a beginning stage of movement, such as when a folding tip of a wing is in an extended position for flight, the rub strip 132 and the seal strip 134 are parallel to each other and engaged with each other within an engagement area 190 along an entire length of at least the shortest of the rub strip 132 and the seal strip 134. As the seal strip 134 rotates about a rotational axis 192, engagement between the rub strip 132 and seal strip 134 remain, but the engagement area 190 between the rub strip 132 and seal strip 134 decreases. For example, as shown in FIGS. 6 and 10, the seal strip 134 has rotated about the rotational axis 192 in the rotational direction 182, from the beginning stage of movement, into a first intermediate stage of movement. In the first intermediate stage of movement, the engagement area 190 is significantly smaller than that in the beginning stage of movement. Also indicated in FIGS. 6 and 10, in additional to rotating about the rotational axis 192, the seal strip 134 also can move translationally, such as in a linear direction 180 relative to the rub strip 132. More specifically, the seal strip 134 moves translationally relative to the rub strip 132 as the rotational axis 192 moves translationally relative to the rub strip 132.

Figure 11:
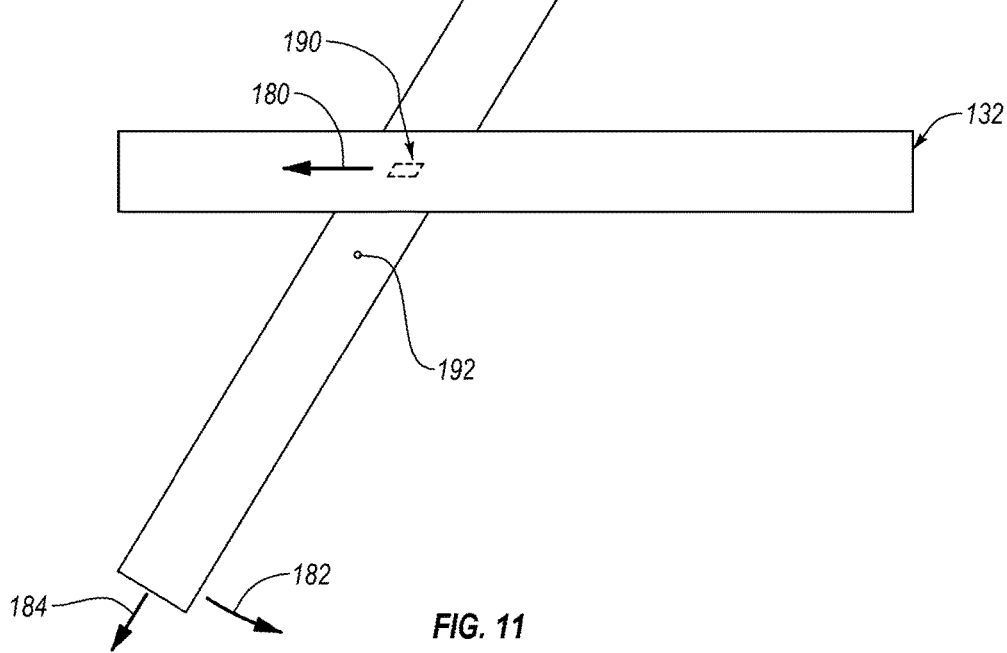
FIG. 11 is a schematic side elevation view of a seal assembly, shown with a seal strip in a second intermediate stage of movement relative to a rub strip, according to one or more embodiments of the present disclosure.
Figure 12:
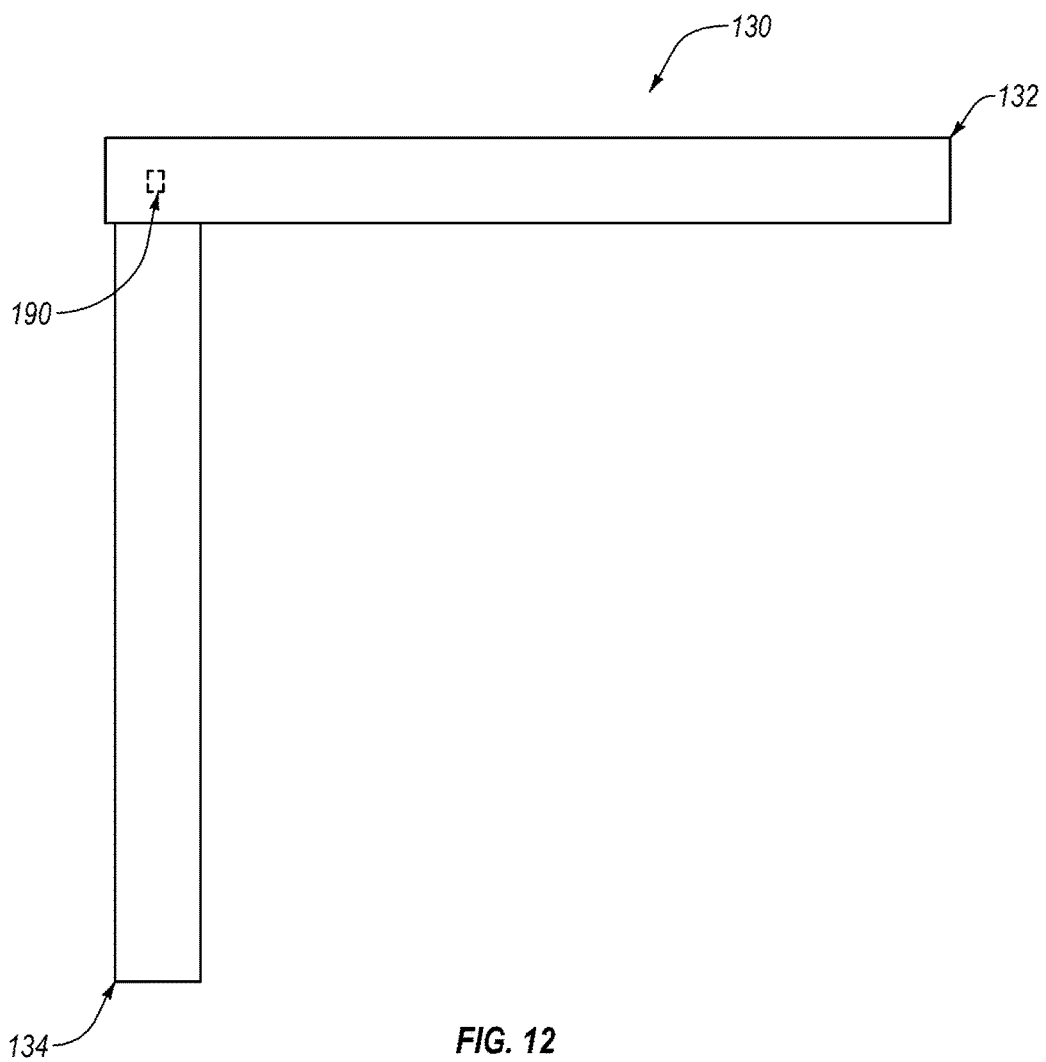
FIG. 12 is a schematic side elevation view of a seal assembly, shown with a seal strip in a final stage of movement relative to a rub strip, according to one or more embodiments of the present disclosure.

Due to the translational movement of the rotational axis 192, the engagement area 190 also moves translationally in the linear direction 180. For example, as shown in FIGS. 7 and 11, the seal strip 134 has rotated about the rotational axis 192 in the rotational direction 182, from the first intermediate stage of movement, into a second intermediate stage of movement. Compared to the first intermediate stage, the engagement area 190 has moved translationally in the linear direction 180 and is at least slightly smaller. Additionally, the rotational axis 192 has not only moved translationally in the linear direction 180, but has also moved translationally in a direction perpendicular to the linear direction 180. Eventually, the seal strip 134 continues to rotate about rotational axis 192 and move translationally in the linear direction 180 and a linear direction perpendicular to the linear direction 180 until a final stage of movement is reached as shown in FIGS. 8 and 12. In the final stage of movement, such as when a folding tip of a wing is in a retracted or folded position for storage, the lengths of the seal strip 134 and the rub strip 132 are substantially perpendicular to each other. Moreover, in some implementations, in the final stage of movement, the engagement area 190 is positioned proximate ends of the seal strip 134 and rub strip 132.

Figure 13:
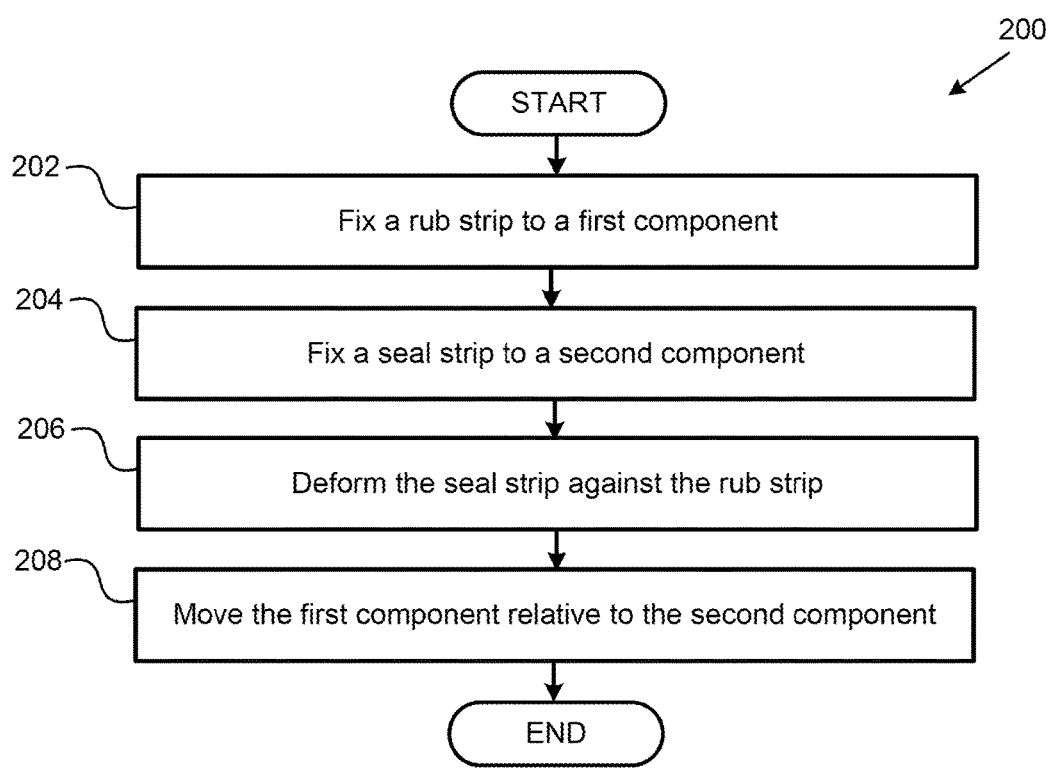
FIG. 13 is schematic flow diagram of a method of sealing a gap between a first component and a second component, according to one or more embodiments of the present disclosure.

Referring to FIG. 13, according to one embodiment, a method 200 of sealing a gap between a first component and a second component is shown. The method 200 may be practiced using the seal assembly 130 of the various embodiments described above and shown in the FIGS. 1-12. The method 200 includes fixing a rub strip to a first component at 202, and fixing a seal strip to a second component at 204. Additionally, the method 200 includes deforming the seal strip against the rub strip at 206. Deformation of the seal strip against the rub strip forms a seal between the seal strip and the rub strip. In conjunction with deforming the seal strip against the rub strip at 206, the method 200 may include deforming the rub strip against the first component, to form a seal between the rub strip and the first component, and deforming the seal strip against the second component, to form a seal between the seal strip and the second component. Additionally, the method 200 includes, while the gap is sealed using the rub strip and the seal strip, moving the first component relative to the second component at 208.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A seal assembly for sealing a gap between a first component and a second component, wherein the second component is movable relative to the first component, the seal assembly comprising:
   a rub strip comprising:
      a seal strip engagement surface having a convex shape; and
      a first component engagement surface, opposite the seal strip engagement surface and having a concave shape, wherein the first component engagement surface is resiliently flexible; and
   a seal strip comprising:
      a rub strip engagement surface having a convex shape;
      a second component engagement surface, opposite the rub strip engagement surface and having a concave shape, wherein the second component engagement surface is resiliently flexible;
   wherein the seal strip engagement surface is harder than the rub strip engagement surface.

2. The seal assembly of claim 1, wherein the seal strip is hollow.

3. The seal assembly of claim 1, wherein the seal strip is more compressible than the rub strip.

4. The seal assembly of claim 1, wherein the concave shape of the first component engagement surface of the rub strip, the convex shape of the seal strip engagement surface of the rub strip, the convex shape of the rub strip engagement surface of the seal strip, and the concave shape of the second component engagement surface of the seal strip are curved.

5. The seal assembly of claim 1, wherein:
   the seal strip further comprises an internal stiffener interposed between the rub strip engagement surface and the second component engagement surface of the seal strip; and
   the internal stiffener is stiffer than the second component engagement surface.

6. The seal assembly of claim 5, wherein the internal stiffener is made of a material different than that of the second component engagement surface.

7. The seal assembly of claim 6, wherein the internal stiffener is curved to complement a curvature of the second component engagement surface of the seal strip.

8. The seal assembly of claim 1, wherein a radius of curvature of the rub strip engagement surface of the seal strip is less than that of the second component engagement surface of the seal strip.

9. The seal assembly of claim 1, wherein a radius of curvature of the seal strip engagement surface of the rub strip is less than that of the first component engagement surface of the rub strip.

10. The seal assembly of claim 1, wherein:
the rub strip further comprises a first retainment element extending from the first component engagement surface in a direction away from the seal strip engagement surface; and
the seal strip further comprises a second retainment element extending from the second component engagement surface in a direction away from the rub strip engagement surface.

11. The seal assembly of claim 10, further comprising:
a first retainment plate comprising a first channel for receiving and retaining the first retainment element of the rub strip; and
a second retainment plate comprising a second channel for receiving and retaining the second retainment element of the seal strip, wherein the second retainment plate is harder than the second retainment element of the seal strip.

12. The seal assembly of claim 11, wherein:
the first retainment element of the rub strip has a first bulbous-shaped cross-section;
the second retainment element of the seal strip has a second bulbous-shaped cross-section;
the first channel of the first retainment plate has a cross-sectional shape complementing the first bulbous-shaped cross-section of the first retainment element; and
the second channel of the second retainment plate has a cross-sectional shape complementing the second bulbous-shaped cross-section of the second retainment element.

13. The seal assembly of claim 11, further comprising a rod passing through the second retainment element of the seal strip, wherein the rod is harder than the second retainment element.

14. A seal assembly for sealing a gap between a first component and a second component, wherein the second component is movable relative to the first component, the seal assembly comprising:
a rub strip comprising:
a seal strip engagement surface having a convex shape; and
a first component engagement surface, opposite the seal strip engagement surface and having a concave shape; and
a seal strip comprising:
a rub strip engagement surface having a convex shape;
a second component engagement surface, opposite the rub strip engagement surface and having a concave shape;
wherein:
the seal strip engagement surface is harder than the rub strip engagement surface;
a radius of curvature of the rub strip engagement surface of the seal strip is less than that of the second component engagement surface of the seal strip; and
a radius of curvature of the seal strip engagement surface of the rub strip is less than that of the first component engagement surface of the rub strip.

* * * * *